Feb. 7, 1961  C. C. BROWN  2,970,649
PRESSURE SEALED PACKER
Original Filed Jan. 11, 1954  9 Sheets-Sheet 1

C. C. Brown
INVENTOR.

BY

ATTORNEY

Feb. 7, 1961

C. C. BROWN

2,970,649

PRESSURE SEALED PACKER

Original Filed Jan. 11, 1954

C. C. Brown
INVENTOR.

BY

ATTORNEY

United States Patent Office 2,970,649
Patented Feb. 7, 1961

2,970,649

PRESSURE SEALED PACKER

Cicero C. Brown, % Brown Oil Tools Inc.,
P.O. Box 19236, Houston, Tex.

Continuation of application Ser. No. 403,328, Jan. 11, 1954. This application Aug. 18, 1958, Ser. No. 755,523

7 Claims. (Cl. 166—121)

This application is a continuation of my co-pending application, Serial No. 403,328, filed January 11, 1954.

This invention relates to well packers and particularly to packers adapted to be actuated by differential fluid pressures across the packer.

Conventional well packers are, in general, composed of two primary elements, namely, (1) a resilient sealing element which is adapted to be radially expanded, usually by axial compression, into sealing engagement with a well wall; and (2) an anchoring element by which the packer structure is secured to the well wall and which also serves as a supporting base for the sealing element against which the latter is compressed in effecting its expansion.

In such conventional packers, the anchoring element is usually a relatively complicated structure which includes a plurality of toothed slips mounted in a slip cage and actuated by a conical mandrel which is moved into and out of expansive engagement with the slips by relative rotation and reciprocation of an operating stem which forms a part of the inner string of well pipe. The slip cage will also usually have springs or blocks adapted to frictionally engage the well wall to hold the slip cage stationary in order to permit relative movement of the operating stem. The sealing element of such conventional packers will then be expanded by applying the weight of the operating string to the sealing element and compressing it against the now stationary base formed by the anchoring element.

As is well known to those familiar with the packer art, conventional packers are relative complex structures which require a series of careful manipulative operations to actuate them effectively and are subject to numerous operating difficulties both in setting and releasing.

The present invention has for its primary object the provision of an improved type of well packer whose construction and operation is greatly simplified as compared with more conventional designs and which has high sealing efficiency at all pressures and particularly high pressures.

A principal object of the present invention is to provide a packer construction in which the actuation of both the anchoring and sealing elements is effected by differential fluid pressures.

Another object is to provide a packer structure in which the wall-engaging slips are secured directly to the exterior of the resilient sealing element for movement into and out of gripping engagement with the well wall contemporaneously with expansion and contraction of the sealing element.

A further object is to provide a packer structure wherein actuation of both the anchoring and sealing elements is effected by the creation of a differential pressure across the structure.

Still another object is to provide a packer structure which is actuated by differential pressure and which will be automatically anchored against displacement in the direction in which the pressure differential is exerted.

A further object is the provision of a packer structure in which setting and release of the packer is effected simply by the opening and closing of a valve in the bore of the structure.

Other and more specific objects and advantages of the present invention will become more readily apparent from the following detailed description when read in conjunction with the accompanying drawing which illustrates several useful embodiments in accordance with this invention.

Each of the several illustrative embodiments comprises, in general, (1) a tubular packer structure which includes the resilient sealing elements and the anchoring elements; and (2) a valve means operable by manipulation of the operating pipe to close and open the bore of the packer structure to thereby respectively actuate and release the sealing and anchoring elements.

The embodiment illustrated in Figs. 1, 5, 5A and 9 includes a packer structure, designated generally by the numeral 15, and a valve mechanism, designated generally by the numeral 16, for opening and closing the bore of the packer and which also operatively secures the packer structure to the operating pipe 17, such as a conventional well tubing string which extends to the surface.

Packer structure 15 comprises a tubular body 18 having mounted about the exterior thereof a pair of generally tubular sealing elements, designated generally by the numerals 19—19. Each of the sealing elements 19 is constructed of flexible resilient material, such as natural or synthetic rubber, or other well-known resilient composition material commonly employed in sealing elements for well packers. Each of the sealing elements comprises a generally tubular body section 20 merging at one end into an externally enlarged cup-shaped seal portion 21. The external diameter of seal portion 21, in its normal preformed unstressed condition, is made somewhat larger than that of body section 20 and its maximum unstressed diameter, as at point 22, is made approximately equal to the internal diameter of the well casing C (Fig. 1) in which the packer is to be run so that the seal portions will be in continuous frictional contact with the inner wall of the casing at all times for purposes to be described hereinafter. The bore 23 of each sealing element is made somewhat larger in diameter than the exterior of body 18 and is flared outwardly interiorly of the seal portions 21 to provide the cup-shaped configuration therefor and a desired degree of flexibility in the wall thereof.

Sealing elements 19 are mounted on body 18 so that the cup-shaped seal portions 21 face in opposite directions along the body. The inner end of each sealing element is secured, as by vulcanizing or in any other suitable and well-known manner, to a metal end ring 24. Mounted on the exterior surface of body portion 20 of each sealing element is a plurality of segmental slips 25 having teeth 26 on their external faces. Slips 25 are effectively secured to the exterior surface of body portion 20 in any well-known manner, as by vulcanizing the metal slips directly to the rubber composition material of which the sealing element is composed. The slips will be so positioned on the exterior of the sealing element, as by embedding them in the exterior of body portion 20, that in the normal unstressed, that is, unexpanded, condition of the sealing elements, teeth 26 will lie inside a circle which defines the maximum external diameter of seal portion 21. With such arrangement it will be seen that when the sealing element is in normal unstressed position, slips 25 will be out of engagement with the well wall, such as the wall of casing C, so that the packer structure may slide freely through the well casing, except for the frictional engagement of portions 21 with the well wall.

The number of slips 25 which will be employed will preferably be such as to form a continuous ring of slips about body portion 20 when the latter is in its normal unstressed condition. Each slip is provided with a dovetail tongue 27 which is secured in a correspondingly shaped slot 28 in the adjacent end of end ring 24 whereby slips 25 will be radially movable with respect to the end ring.

By mounting the segmental slips 25 directly on the exterior of the sealing element, it will be evident that the slips will be radially advanced and retracted coincident with the expansion and contraction of the sealing element.

The sealing elements 19 are secured to body 18 in any suitable manner. As illustrated, the sealing elements are installed on body 18 with end rings 24 abutting a split lock ring 29 which is seated in an annular groove 30 provided in the exterior of body 18. The adjacent end portions of end rings 24 are provided with externally threaded sections 31 which are adapted to screw into a common keeper collar 32 which encloses lock-ring 29 and the threaded ends of end rings 24. Seal rings 33, such as conventional O-rings, are installed in the inner peripheral surfaces of end rings 24 to provide fluid-tight seals between the exterior of body 18 and the end rings on opposite sides of lock-ring 29.

Figure 5:
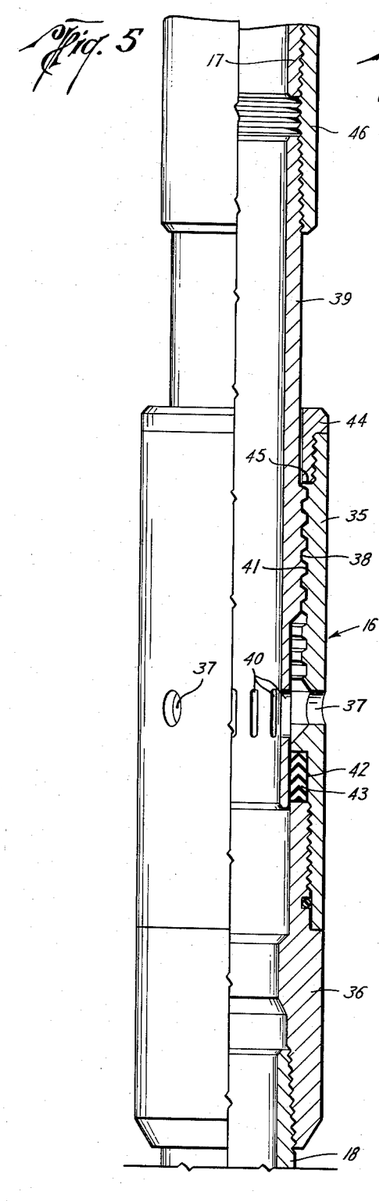
Figs. 5 and 5A, together, constitute a longitudinal quarter-sectional view of the embodiment of Fig. 1 showing the parts thereof in greater detail and in their inactive or unset position.

Valve mechanism 16 includes a tubular valve body 35 which is secured to the upper end of body 18 by means of a sub 36. Valve body 35 is provided intermediate its ends with one or more radial ports 37, above which is provided an internal thread section 38 composed preferably of relatively coarse, free-running threads. A tubular sleeve valve 39 extends into the bore of valve body 35 and is provided with a ring of radial ports 40 opening through the wall of sleeve valve 39 at a point spaced above the inner end of the sleeve valve. A thread section 41 is provided on the exterior of sleeve valve 39 above ports 40 and the threads thereof are adapted to mesh with the threads of thread section 38. A stuffing box 42 is provided in the wall of valve body 35 below ports 37 and contains packing 43 which is adapted to form a fluid-tight seal about the exterior of sleeve valve 39. A bushing 44 is screwed into the upper end of valve body 35 slidably surrounding sleeve valve 39 and the inner end of bushing 44 forms an internal shoulder 45 in the bore of valve body 35 which is engageable with an abutment such as the uppermost thread of thread section 41 to limit upward movement of sleeve valve 39 relative to valve body 35, the stop being so positioned that when sleeve valve 39 is at the uppermost limit of its upward travel in valve body 35, ports 40 will be in registration with ports 37, as best seen in Fig. 5. The thread sections are proportioned so that sleeve valve 39 may be screwed downwardly sufficiently in valve body 35 to move ports 40 below packing 43 to thereby close off communication between the interior of the packer and ports 37, this position being shown in Fig. 1. Sleeve valve 39 is connected to operating string 17 by means of a collar 46. The bores of pipe 17, sleeve valve 39 and body 18 are all in communication and form a passage for fluid through the device to and from the surface.

Figure 5A:
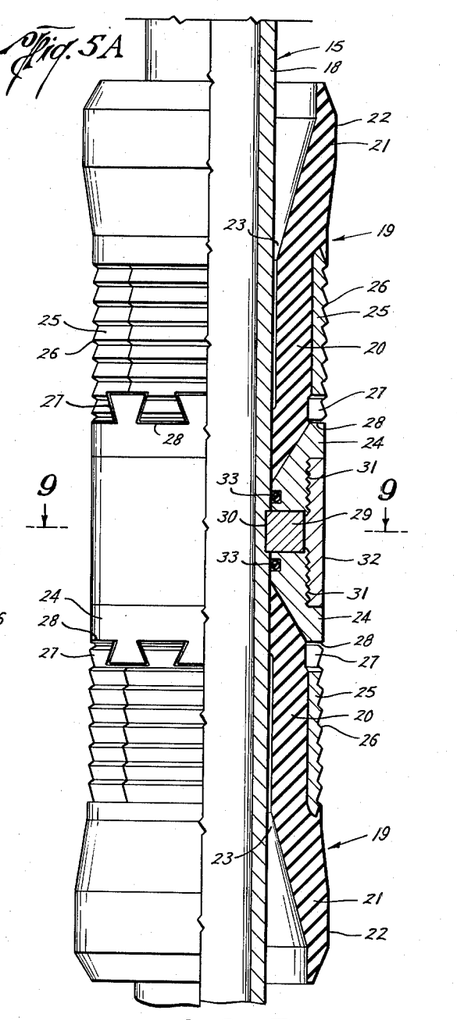

The above described device operates in the following manner: The packer is assembled and secured to the operating pipe 17 substantially as illustrated in Figs. 5 and 5A. Sleeve valve 39 will be in retracted position initially to provide open communication between the interior of the device and the exterior thereof through registering ports 40 and 37. Thus the bore of the operating string will be in open communication with the annular space between the operating string and casing C. The packer will then be lowered through casing C into the well. Fluid usually encountered in the well will be displaced through the bore of the packer body and out through ports 40 and 37 into the casing annulus above sealing elements 19. Enlarged portions 21 will be in sliding frictional engagement with the wall of casing C but as long as the valve ports 40 and 37 are open this engagement will be relatively light and will offer little resistance to the downward movement of the packer.

As soon as the packer is at the depth at which it is to be set, operating pipe 17 will be rotated from the top of the well in a direction to cause sleeve valve 39 to screw downwardly in valve body 35 to cause ports 40 to be moved below packing 43 and thereby close communication between the interior of the operating string and ports 37. It will be understood that the frictional engagement of sealing elements 19 with the well casing wall will serve effectively to hold packer body 18 and valve body 35 stationary to thereby permit relative rotation of the operating string and sleeve valve 39.

Immediately that the valve is closed communication will be cut off between the sections of the well bore above and below the sealing elements and any difference in the fluid pressures above and below the packer will set the packer. If the pressure from below the packer is greater than that above, this pressure will be exerted against the interior of the lower sealing element 19 and will act to radially expand the latter. This expansion will force enlarged seal portion 21 more tightly against the well wall, thereby increasing the sealing efficiency in proportion to the magnitude of the pressure differential. At the same time, the expansion of body portion 20 of the sealing element will advance slips 25 into gripping engagement with the well wall thereby effectively anchoring the packer in place. Obviously the greater the pressure differential the more effectively the slips will grip the well wall.

If the pressure differential is in the downward direction then upper sealing element 19 will be actuated and the slips mounted thereon will be expanded into anchoring engagement with the well wall, contemporaneously with the expansion of the seal portion into sealing engagement with the well wall.

To release the packer, it is only necessary to turn the sleeve valve in the direction to raise ports 40 into registration with ports 37 to again provide communication between the sections of the well above and below the packer whereby the pressures will be equalized. This will permit the sealing elements to contract to their normal dimensions thereby retracting the slips and freeing the packer structure so that it may be pulled upwardly out of the well or moved to some other point along the well bore at which it may be desired to set the packer.

It will be seen that the above described structure provides a very simple and compact packer construction which permits the packer to be set and released simply by opening and closing communication through the packer between the portions of the well above and below the packer. It is found that this type of packer acts very rapidly and forms an exceptionally efficient seal and anchor under all pressure conditions. Only a comparatively small pressure differential, for example, about 40 pounds per square inch, is required to effectively actuate the packer.

The embodiment illustrated in Figs. 2, 6, 6A and 6B differs from the previously described embodiment primarily in the form of valve and valve-operating mechanisms. In the present embodiment the principal elements of the packer structure are essentially the same as in the previous form, including a tubular body 18a, upper and lower cup-type sealing elements 19a—19a having toothed slips 25a arranged as previously described on the exterior of the sealing elements. The sealing elements are secured to body 18a by means of end rings 24a abutting an annular shoulder or boss 29a on the exterior of body 18a and clamped together and against opposite sides of boss 29a by means of the keeper collar 32a. Annular seals 33a are provided between the exterior of body 18a and the inner peripheries of end rings 24a—24a to prevent movement of fluid between body 18a and the inner ends of the sealing elements.

A tubular operating stem 39a extends through the bore of body 18a. The upper end of stem 39a is connected by means of a collar 46a to operating pipe 17a and the lower end of stem 39a carries a similar collar 46b by which the stem may be connected to a lower section of the operating pipe.

Operating stem 39a has an external diameter appreciably smaller than the internal diameter of body 18a to provide a substantial annular clearance space 50 for the passage of fluid between these members. Stem 39a has a cylindrical enlargement 51 at an intermediate point thereof having a diameter such as to provide a relatively close sliding fit in the bore of body 18a. A plurality of spaced apart sealing rings 52, such as conventional O-rings, are seated in the surface of enlargement 51 and are adapted to slidably seal with the bore wall of body 18a when the enlargement is inserted in the bore of body 18a.

It will be seen that enlargement 51 forms a valve member for opening and closing fluid communication through the interior of body 18a between the portions of the well above and below the packer structure.

Sleeves 53 and 54 are secured respectively to the upper and lower ends of body 18a and are provided with bayonet-type or J-slots 55 and 56, respectively, the open legs 57 and 58 of which open to the outer ends of the respective sleeves. Upper and lower collars 46a and 46b carry radially projecting lugs 59 and 60, respectively, which are receivable in the respective J-slots 55 and 56, for releasably locking the valve member 51 in either open or closed position as will be described hereinafter. A plurality of radial ports 61 are provided in the wall of sleeve 53 below J-slot 55 to permit more ready passage of fluid between annular space 50 and the exterior of the packer. A plurality of radial fluid vent ports 62 provide communication between annular space 50 and the exterior of the packer through boss 29a and collar 32a. It will be understood that the seal portions 21a of sealing elements 19a will have a nominal unstressed diameter which, as in the previously described embodiment, will be in continuous frictional contact with the well wall which may be the casing C.

Figure 6:
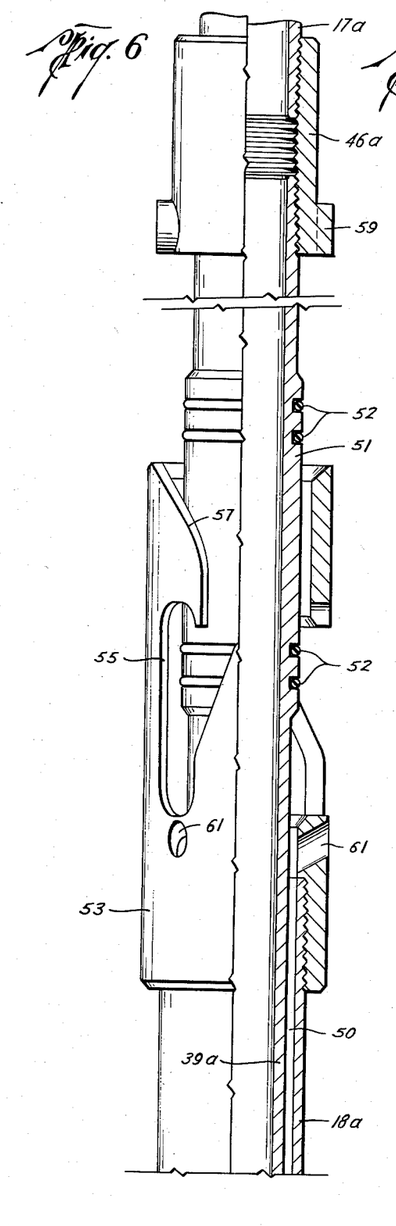
Figs. 6, 6A, and 6B, together, constitute a longitudinal quarter-sectional view of the embodiment of Fig. 2 showing the parts thereof in greater detail and in their inactive or unset position.
Figure 6A:
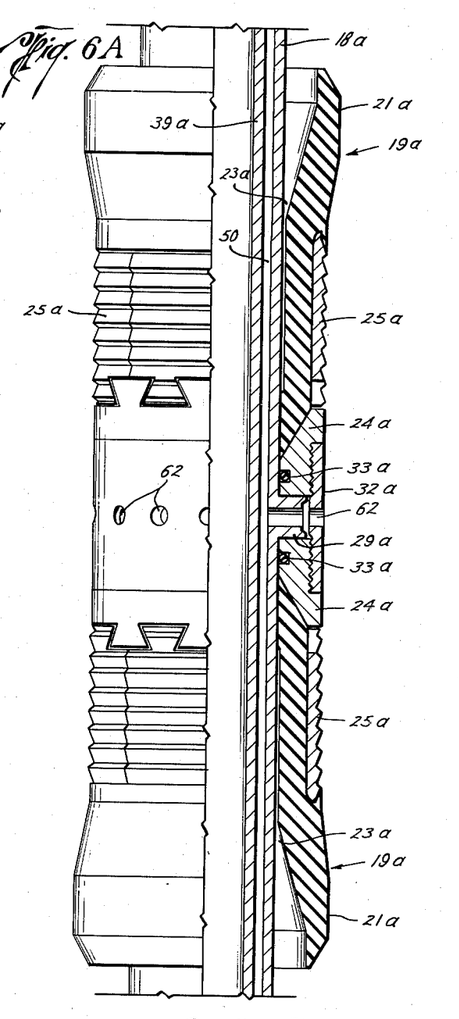
Figure 6B:
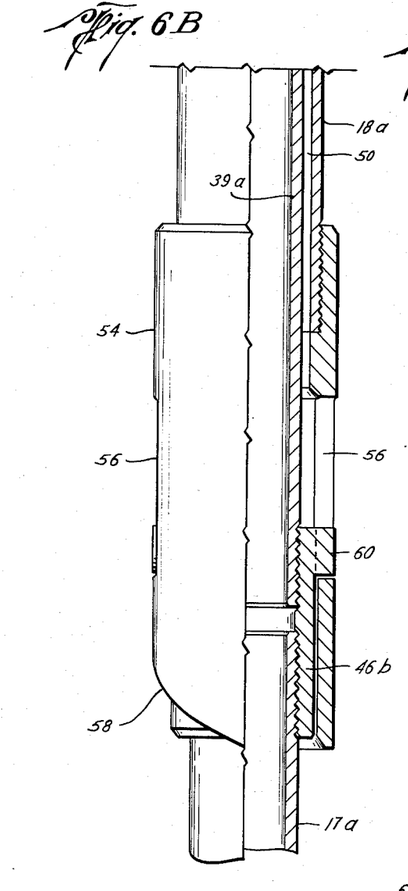
Figure 7:
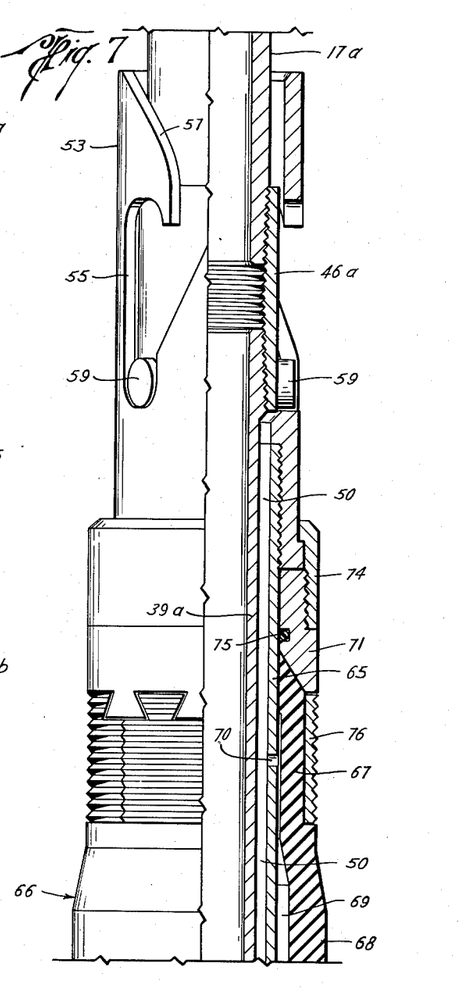
Figs. 7, 7A, and 7B, together, constitute a longitudinal quarter-sectional view of the embodiment of Fig. 3 showing the parts thereof in greater detail and in the positions occupied at a stage immediately preceding actuation.
Figure 7A:
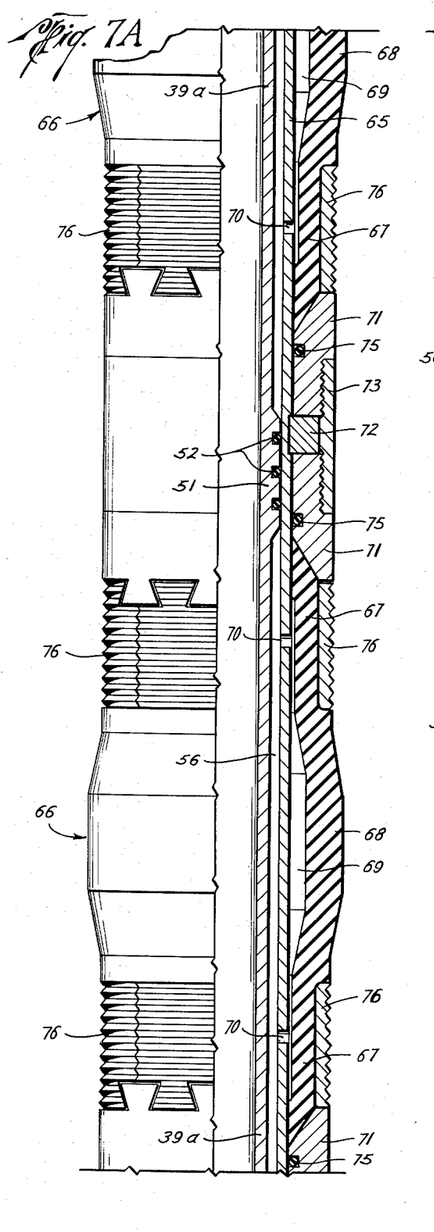
Figure 7B:
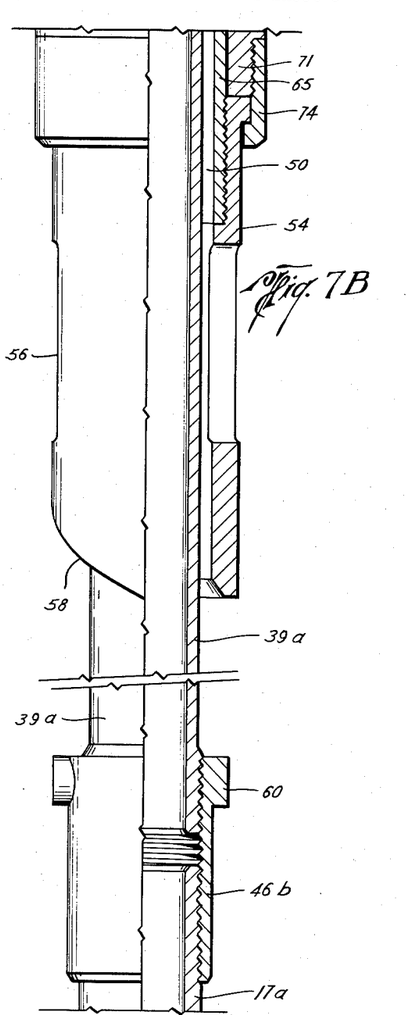

In operation, the packer, assembled as shown in Figs. 6, 6A and 6B, will be lowered in the well with lower J-lug 60 locked in J-slot 56, as shown in Fig. 6B. This will hold valve member 51 in the open position above and out of the bore of body 18a, leaving annular space 50 open for passage of fluid displaced by the structure as it is lowered in the well bore. The resistance offered by the frictional engagement of the sealing elements 19a with the well wall will serve to keep lugs 60 pushing downwardly against the bottom of the closed leg of the J-slot as the operating stem is lowered.

Figure 2:
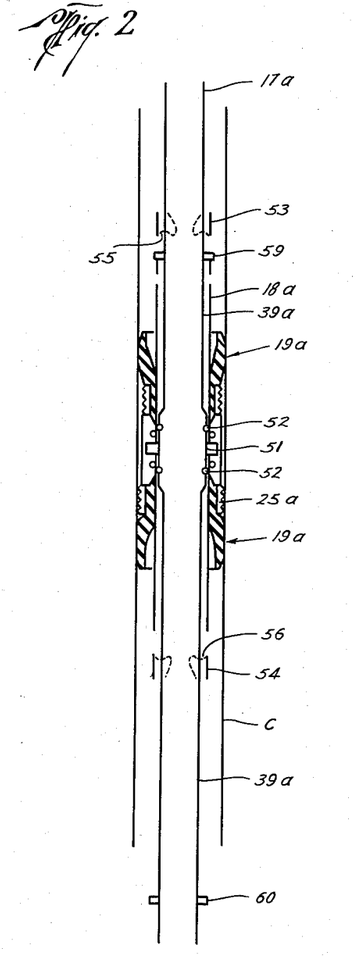

When the setting point has been attained, the operating stem will be rotated in a direction to move lugs 60 out of the closed legs of the J-slots into the open legs 58 freeing the operating stem for downward movement relative to the packer structure. The frictional engagement of sealing elements 19a with the well wall will hold the packer structure stationary to permit these relative movements of the operating stem. The operating stem is then lowered sufficiently to insert valve member 51 into the bore of body 18a. As soon as entry of the valve member is effected, communication will be cut off between the portions of the well bore above and below the packer and any differential pressure will instantly become effective to actuate the sealing and anchoring elements of the packer in exactly the same manner as previously described. Fig. 2 illustrates the structure in the closed or set position.

The distance between valve member 51 and J-lugs 59 will be made such that when the operating stem is lowered sufficiently to bring the J-lugs into engagement with J-slot 55, valve member 51 will be centered opposite boss 29a (Fig. 2), which is at approximately the center of the packer structure. In this position, vent ports 62 serve to vent any fluid which might be trapped between packing rings 52.

As noted, this embodiment is operated simply by lowering and raising the operating stem, by which the bore of body 18a may be closed or opened as desired to set or release the packer.

Figs. 3, 7, 7A, 7B, and 12 illustrate another embodiment differing from the previously described embodiments primarily in the form of the sealing elements.

In this embodiment, the packer structure includes the tubular body 65 on the exterior of which are mounted a pair of generally tubular sealing elements, designated generally by the numerals 66—66. Each of the sealing elements 66 is constructed of flexible resilient material molded to form a pair of end sections 67 of generally axially straight form and a medial section 68 which, in its unstressed condition, is larger in diameter externally than end section 67 and is also enlarged internally to define a chamber 69 between the exterior of body 65 and the inner wall of the sealing element. Ports 70 extend through the wall of body 65 to provide communication between the bore of body 65 and the interior of chamber 69. End rings 71—71 are fixedly secured to the opposite ends of each sleeve member. The end rings 71—71 on the adjacent ends of the sealing elements are secured against the opposite ends of an external shoulder ring 72 and to the exterior of body 65 by means of a locking collar 73, very much as in the previously described embodiments. The outer ends of the sealing elements are also secured to metal end rings 71—71 which are secured to the exterior of body 65 in any suitable manner, as by means of the threaded lock rings 74—74. A seal ring 75 is disposed between the exterior of body 65 and the bore of each of the end rings 71 to form fluid-tight seals for both ends of each of the sealing elements 66.

Toothed slip segments 76 are mounted on the exterior surfaces of each of the straight end sections 67 of the sealing elements in substantially the same manner as in the previously described embodiments and function similarly. It will be understood that the normal unstressed external diameter of enlarged section 68 of the sealing elements will be such as to provide continuous frictional engagement with the wall of the well into which the structure is to be inserted. In the unstressed position of the sealing elements, slip segments 76 will be positioned inside the circle defining the maximum external diameter of section 68 of the sealing element.

The valve and operating elements employed with the embodiment of Figs. 3, 7, 7A, 7B, and 12 may be, as will be evident from these figures, substantially identical with that illustrated in Figs. 2, 6, 6A and 6B, and described above. Because of the substantial identity of these parts they are designated by the same numerals as are employed in the embodiment last described.

The parts include the operating stem 39a which extends slidably through the bore of body 65 and is connected between sections of pipe string 17a by means of the connecting collars 46a and 46b. An enlargement constituting the valve element 51, fitted with the seal rings 52, is provided on stem 39a intermediate its ends and is insertible into the bore of body 65 to close off communication between the portions of the well above and below the packer. The opposite ends of body 65 carry the upper and lower sleeves 53 and 54, respectively, having the J-slots 55 and 56, respectively, adapted to receive the J-lugs 59 and 60 mounted on collars 46a and 46b, respectively.

Figures 3, 4:
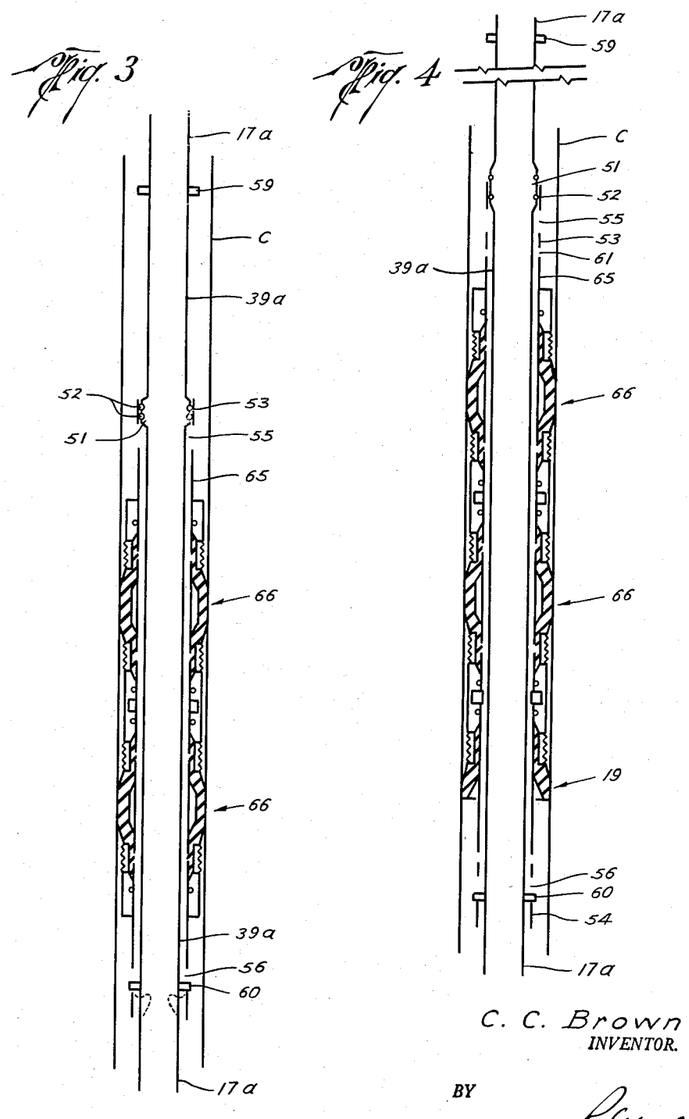

The operation of this embodiment is substantially the same as in the last-described embodiment. Fig. 3 shows the parts of the device in the unset position being lowered in the well. At the setting point stem 39a is lowered through body 65 so that valve member 51 will seal the bore of the body, as illustrated particularly in Fig. 12. The packer structure will, of course, be held stationary relative to the operating stem by the frictional engagement of sections 68 of the sealing elements with the well wall. As soon as closing of the bore of body 65 is thus effected, the differential pressure between the portion of the well above and below the packer will become effective to actuate the sealing and anchoring elements of the packer. If the differential pressure is in the upward direction, this pressure will be transmitted through the portion of annular space 50 below valve element 51 and thence through ports 70 into chamber 69 in the lower sealing element 66. The differential pressure will expand the latter, tightening the sealing engagement of section 68 with the well wall while, at the same time, expanding end sections 67 sufficiently to drive slips 76 into gripping engagement with the well wall to thereby securely anchor the packer to the well wall. If the differential pressure is in the downward direction, the upper sealing and anchoring elements will be similarly actuated.

Figure 1:
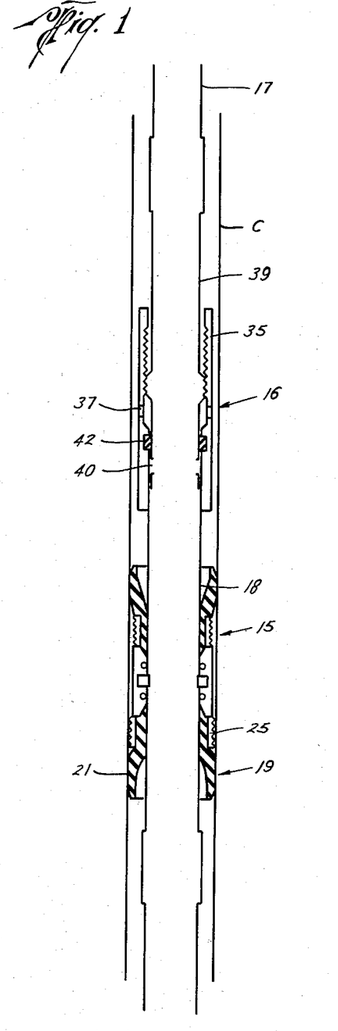
Figs. 1, 2, 3 and 4, are generally diagrammatic longitudinal views of four different embodiments of well packers in accordance with this invention, Figs. 1 and 2 illustrating two of the embodiments in set or sealing position, and Figs. 3 and 4 illustrating the other two embodiments in inactive or non-set positions.
Figures 8, 8A:
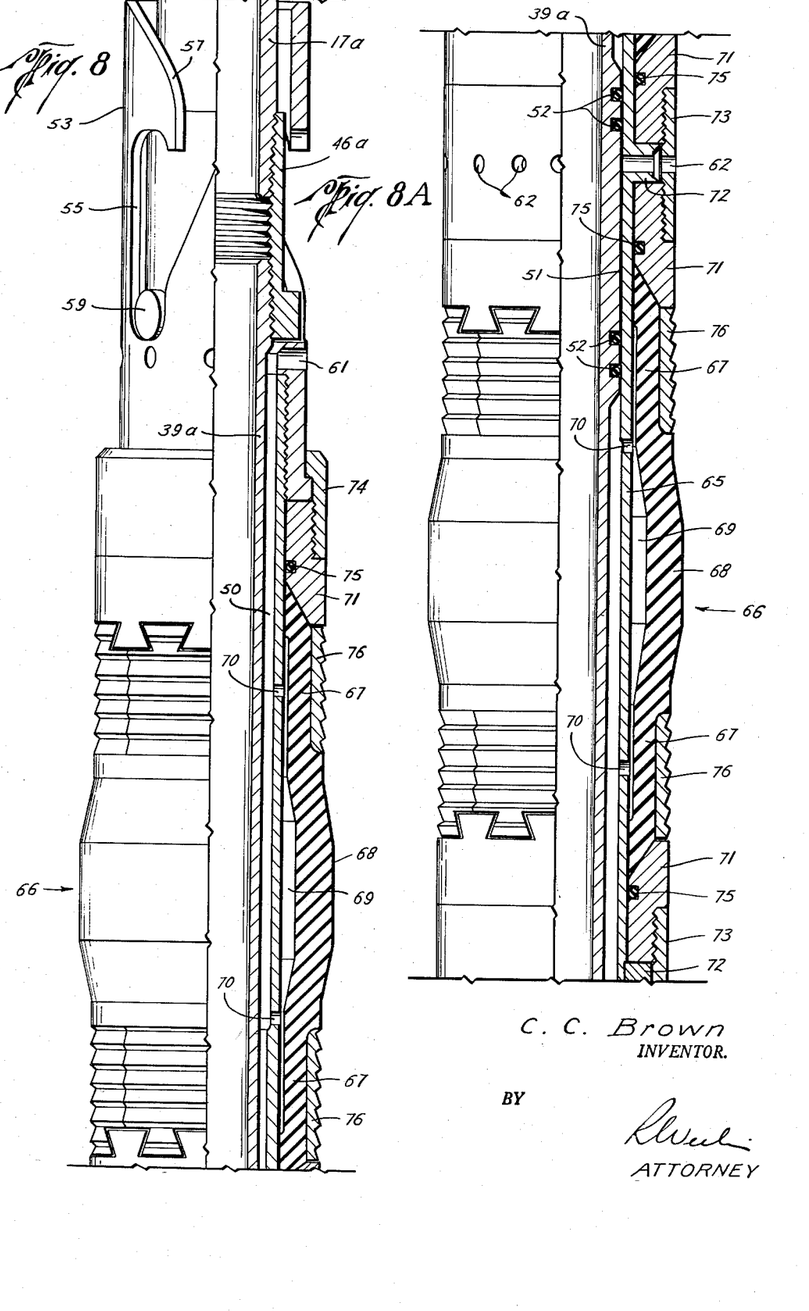
Figs. 8, 8A, and 8B, together, constitute a longitudinal quarter-sectional view of the embodiment of Fig. 4 showing the parts thereof in greater detail in the positions occupied at a stage immediately preceding actuation.
Figures 8B, 9, 10:
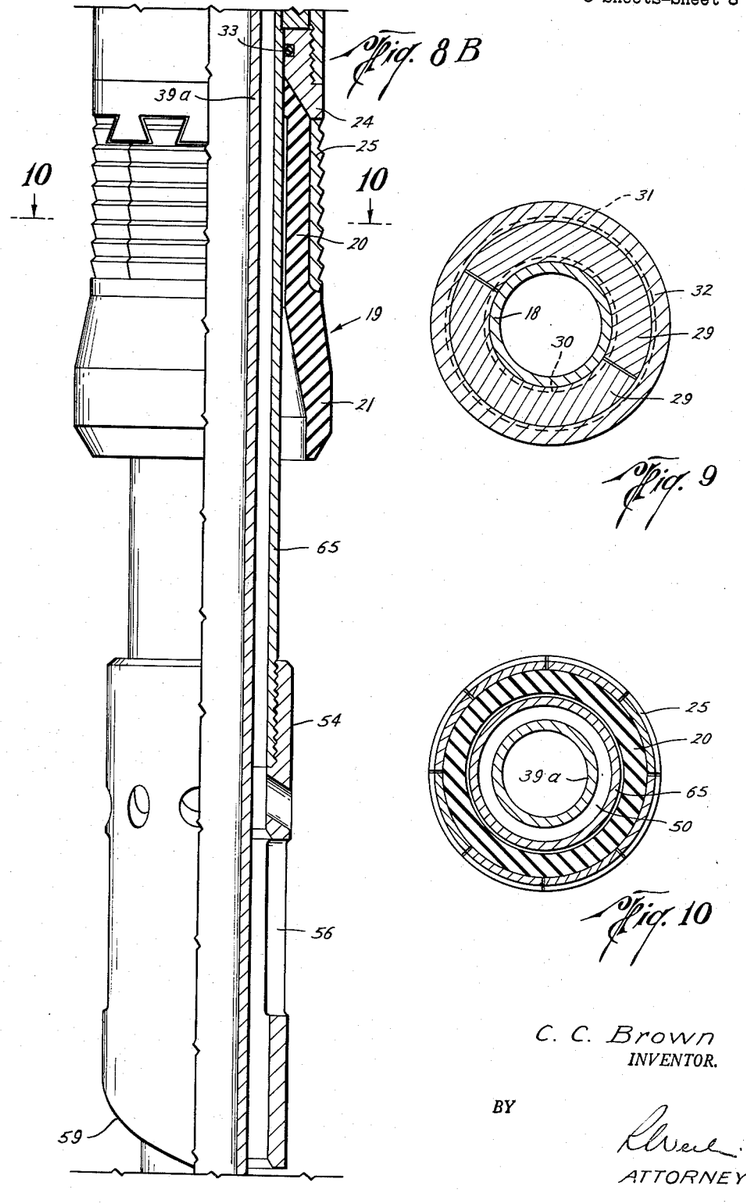
Fig. 9 is a cross-sectional view on line 9—9 of Fig. 5A.
Fig. 10 is a cross-sectional view on line 10—10 of Fig. 8B.
Figure 11:
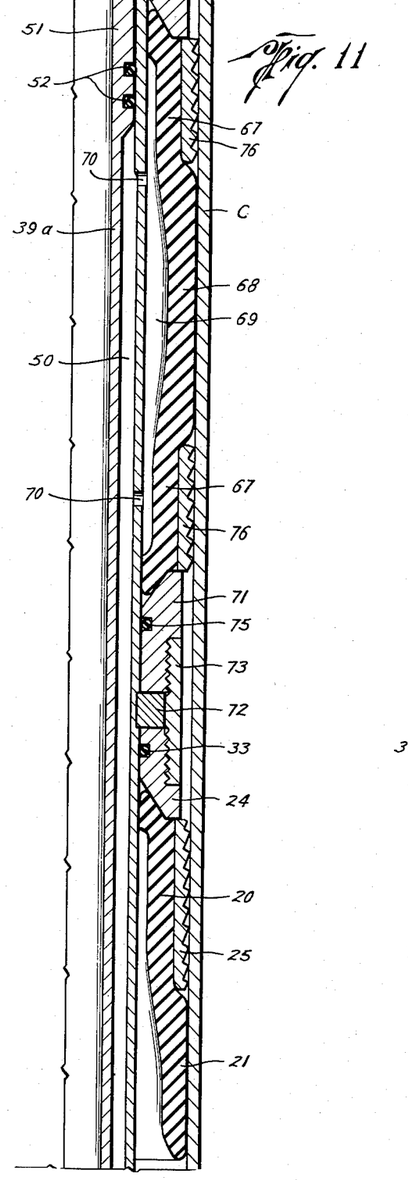
Fig. 11 is a fragmentary longitudinal sectional view of the lower sealing and anchoring elements of Figs. 8A and 8B showing the positions occupied by the parts when the device is fully actuated.
Figure 12:
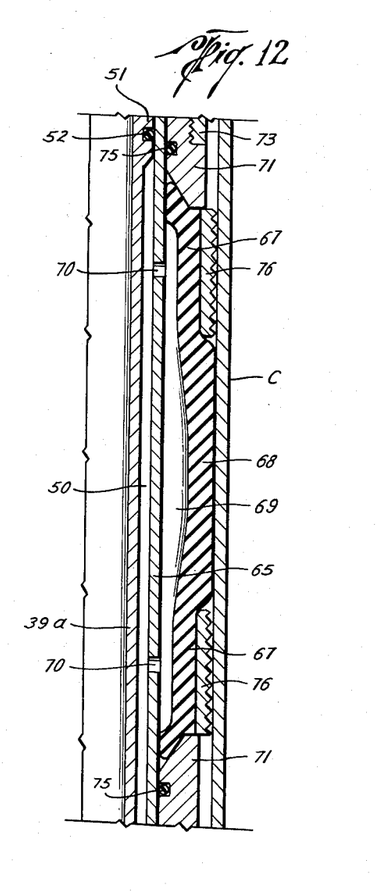
Fig. 12 is a fragmentary longitudinal sectional view of the sealing and anchoring elements of Fig. 7A in fully actuated position.

Figs. 4, 8, 8A, 8B and 11 illustrate a modification of the embodiment illustrated in Fig. 3, in which a cup-type sealing element identical with sealing elements 19 and 19a of Figs. 1 and 2 is combined with a pair of the sleeve-type sealing elements 66 of Fig. 3. This combination may be employed when desired to increase the sealing and anchoring efficiency of the packer. In the illustrative form one of the sealing elements 19 is mounted on body 65 below the lower sealing element 66 to be actuated along with the lower sealing element 66 when the pressure differential is in the upward direction. Fig. 11 shows the seals and slips in their actuated positions under the latter condition. A similar sealing element 19a may be placed above the upper sealing element 66, if desired, particularly where the differential pressure is in the downward direction. Fig. 4 illustrates the parts in the positions occupied when running in the well and Figs. 8, 8A and 8B show the parts with the valve member in the closed position immediately prior to activation of the packer.

It will be evident that the valve mechanisms of Fig. 1 may be employed with the sealing and anchoring elements of Figs. 3 and 4 without altering the important principle of operation of the packer.

It will be obvious that the packer will function with only a single sealing element, which may be either the cup-type or the sleeve-type described above. In the case of the cup-type seal, the open end will be faced in the direction from which the higher pressure is anticipated. The double arrangements illustrated will ordinarily be preferable, since they will be automatically actuated upon closing of the valve irrespective of the direction of the differential pressure.

It will be understood that the differential pressure necessary to actuate the packer may be developed in numerous ways well known to those skilled in the art. The pressure may be that of the fluids in the earth formation traversed by the well bore, or of fluids pumped into the well through the operating pipe or into the casing annulus as in cementing, acidizing, and similar operations.

It will be evident that numerous additional modifications and alterations may be made in the details of the illustrative embodiment within the scope of the appended claims but without departing from the spirit of this invention.

What I claim and desire to secure by Letters Patent is:

1. A well packer comprising a tubular body adapted for insertion into a well bore on an operating string, upper and lower hollow annular resilient sealing elements surrounding said body, an end ring on the adjacent end of each sealing element, means securing both end rings to the body, a plurality of circumferentially disposed slips secured to the outer surfaces of said sealing elements adjacent said end rings, tongue and slot connections between said slips and said end rings permitting radial movement but preventing vertical movement of said slips, an upper portion of said upper sealing element extending above the slips thereon and a lower portion of said lower sealing element extending below the slips thereon flaring outwardly to increased diameters greater than the diameter of said slips in their retracted positions, means communicating with the bore of the tubular body establishing fluid flow from the bore of the well through the tubular body to the exterior thereof by which the fluid pressure on the respective sealing elements is equalized, and valve means secured to the operating string and cooperable with said fluid flow establishing means to open or close said means whereby when said valve means is closed differential fluid pressure is created in the well bore above and below the sealing elements to cause the higher fluid pressure to radially expand one of said sealing elements into sealing engagement with the well bore and to radially move the slips secured thereto into anchoring engagement with the wall of the well bore.

2. A well packer as described in claim 1 in which a fluid vent port extends from the bore of said tubular body to the exterior of the packer at a point between the upper and lower sealing elements.

3. A well packer as described in claim 1 wherein said sealing elements comprise cup seals having their open ends facing toward the opposite ends of the body.

4. A well packer comprising a tubular body adapted for insertion into a well bore on an operating string, upper and lower hollow annular resilient sealing elements surrounding said body, a fixed annular shoulder on said body between said sealing elements, an end ring between said shoulder and the adjacent end of each sealing element, means securing both end rings against said shoulder, a plurality of circumferentially disposed slips secured to the outer surfaces of said sealing elements adjacent said end rings, tongue and slot connections between said slips and said end rings permitting radial movement but preventing vertical movement of said slips, an upper portion of said upper sealing element extending above the slips thereon and a lower portion of said lower sealing element extending below the slips thereon flaring outwardly to increased diameters greater than the diameter of said slips in their retracted positions, means communicating with the bore of the tubular body establishing fluid flow from the bore of the well through the tubular body to the exterior thereof by which the fluid pressure on the respective sealing elements is equalized, and valve means secured to the operating string and cooperable with said fluid flow establishing means to open or close said means whereby when said valve means is closed differential fluid pressure is created in the well bore above and below the sealing elements to cause the higher fluid pressure to radially expand one of said sealing elements into sealing engagement with the well bore and to radially move the slips secured thereto into anchoring engagement with the wall of the well bore.

5. A well packer comprising a tubular body adapted for insertion into a well bore on an operating string, upper and lower hollow annular resilient sealing elements surrounding said body, said sealing element comprising cup seals having their open ends facing toward opposite ends of the body, an end ring on the adjacent end of each sealing element, means securing both end rings to the body, a plurality of circumferentially disposed slips secured to the outer surfaces of said sealing elements adjacent said end rings, tongue and slot connections between said slips and said end rings permitting radial movement but preventing vertical movement of said slips, the upper end portion of said upper sealing element and the lower end portion of said lower sealing element flaring outwardly to increased diameters greater than the diameter of said slips in their retracted positions, means including radial openings through the wall of the body above the upper sealing element communicating with the bore of the tubular body establishing fluid flow from the bore of the well through the tubular body to the exterior thereof by which the fluid pressure on the respective sealing elements is equalized, and sleeve valve means secured to the operating string and threadedly connected to the body cooperable with said openings to open or close the same in response to rotation of the valve means relative to the body, whereby when said openings are closed differential fluid pressure is created in the well bore above and below the sealing elements to cause the higher fluid pressure to radially expand one of said sealing elements into sealing engagement with the well bore and to radially move the slips secured thereto into anchoring engagement with the wall of the well bore.

6. A well packer comprising a tubular body adapted for insertion into a well bore on an operating string, upper and lower hollow annular resilient sealing elements surrounding said body, a fixed annular shoulder on said body between said sealing elements, an end ring between said shoulder and the adjacent end of each sealing element, a keeper collar surrounding said shoulder and secured to both said end rings to retain said rings against said shoulder, a plurality of circumferentially disposed slips secured to the outer surfaces of said sealing elements adjacent said end rings, tongue and slot connections between said slips and said end rings permitting radial movement but preventing vertical movement of said slips, an upper portion of said upper sealing element extending above the slips thereon and a lower portion of said lower sealing element extending below the slips thereon flaring outwardly to increased diameters greater than the diameter of said slips in their retracted positions, means communicating with the bore of the tubular body establishing fluid flow from the bore of the well through the tubular body to the exterior thereof by which the fluid pressure on the respective sealing elements is equalized, and valve means secured to the operating string and cooperable with said fluid flow establishing means to open or close said means whereby when said valve means is closed differential fluid pressure is created in the well bore above and below the sealing elements to cause the higher fluid pressure to radially expand one of said sealing elements into sealing engagement with the well bore and to radially move the slips secured thereto into anchoring engagement with the wall of the well bore.

7. A well packer as described in claim 6 in which a fluid vent port extends from the bore of said tubular body through said shoulder and through said keeper collar to the exterior of the packer between said upper and lower sealing elements.

References Cited in the file of this patent

UNITED STATES PATENTS

| | | |
|---|---|---|
| 2,194,331 | Storm | Mar. 19, 1940 |
| 2,343,076 | Otis | Feb. 29, 1944 |
| 2,373,005 | Baker | Apr. 3, 1945 |
| 2,379,079 | Hayward | June 26, 1945 |
| 2,578,900 | Ragan | Dec. 18, 1951 |
| 2,585,706 | Ware | Feb. 12, 1952 |
| 2,618,345 | Tucker | Nov. 18, 1952 |
| 2,691,418 | Connolly | Oct. 12, 1954 |
| 2,704,579 | Brown | Mar. 22, 1955 |